United States Patent Office 2,949,995
Patented Aug. 23, 1960

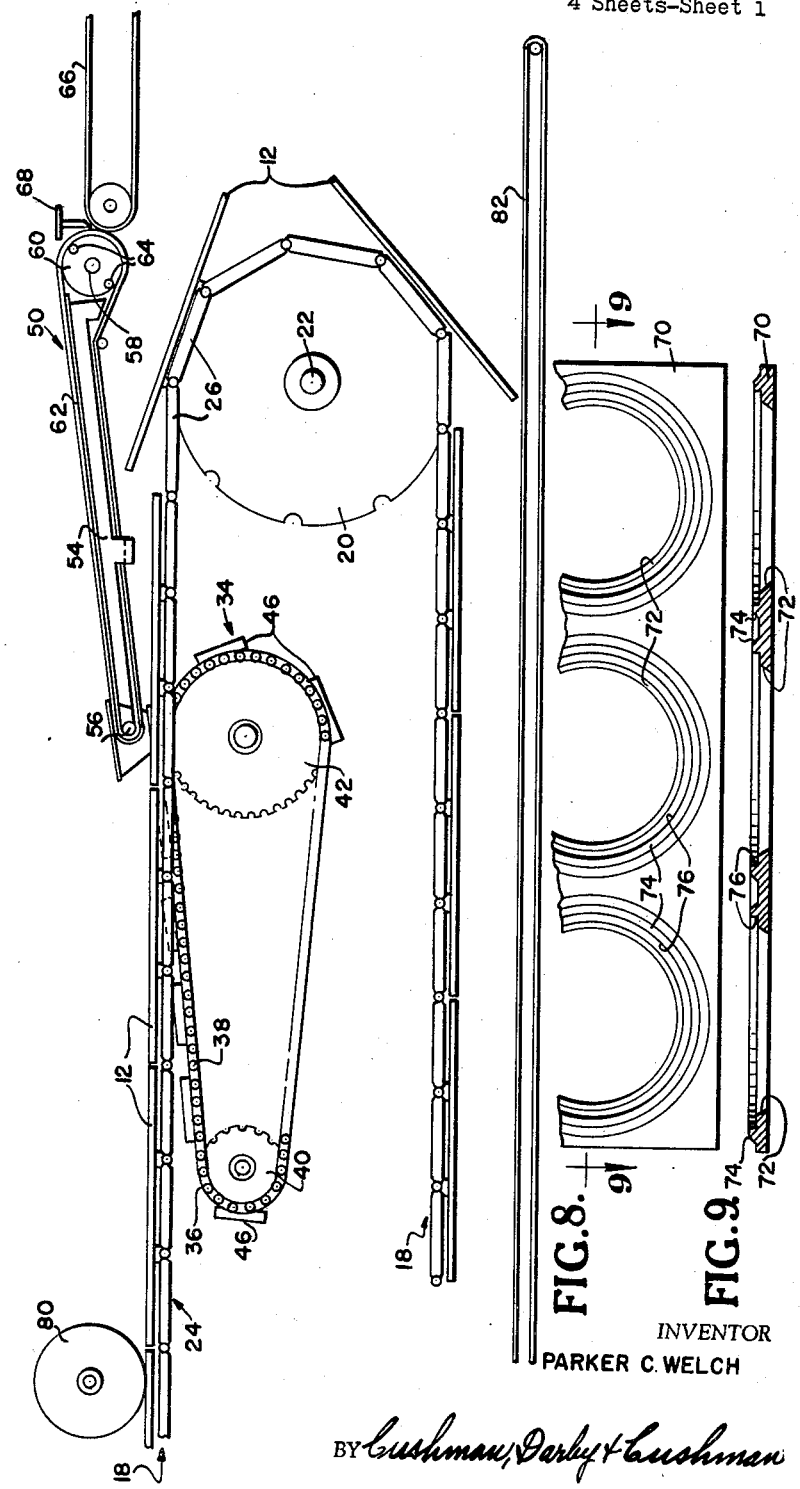

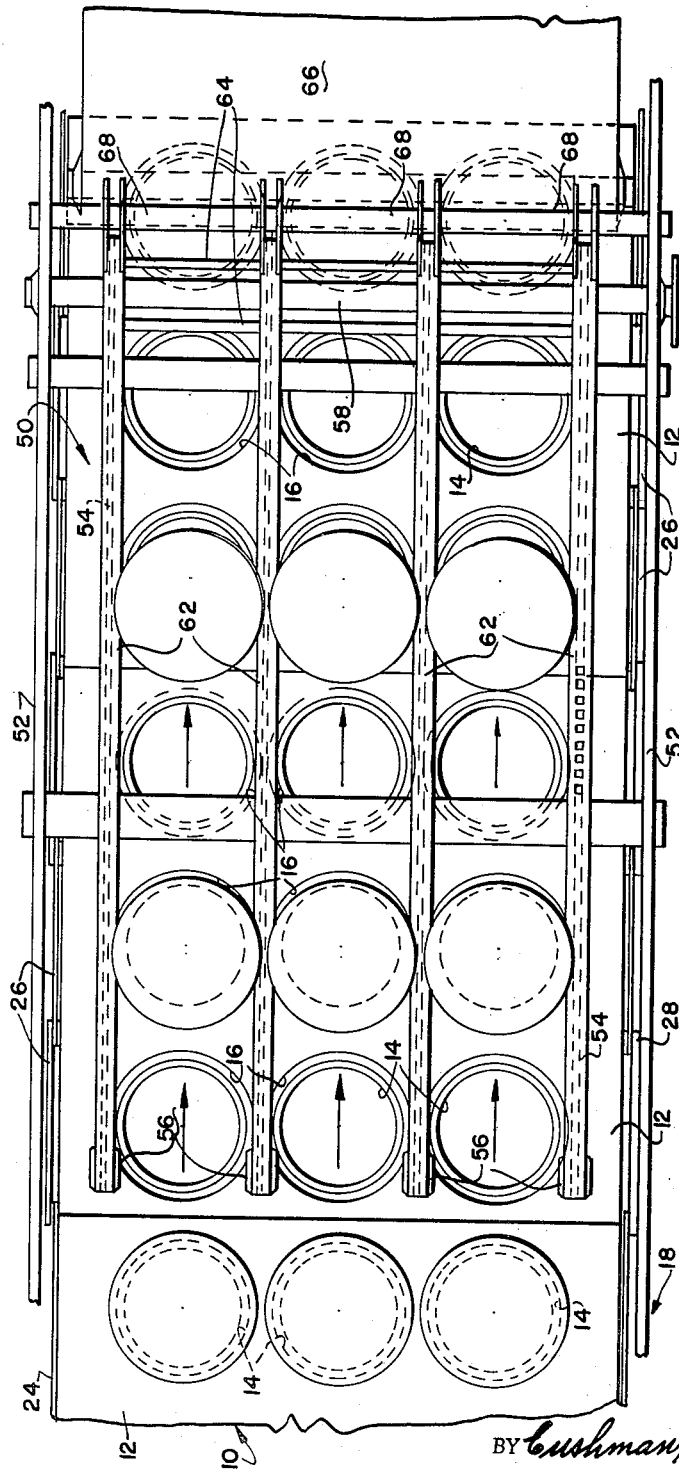

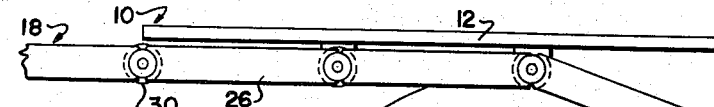
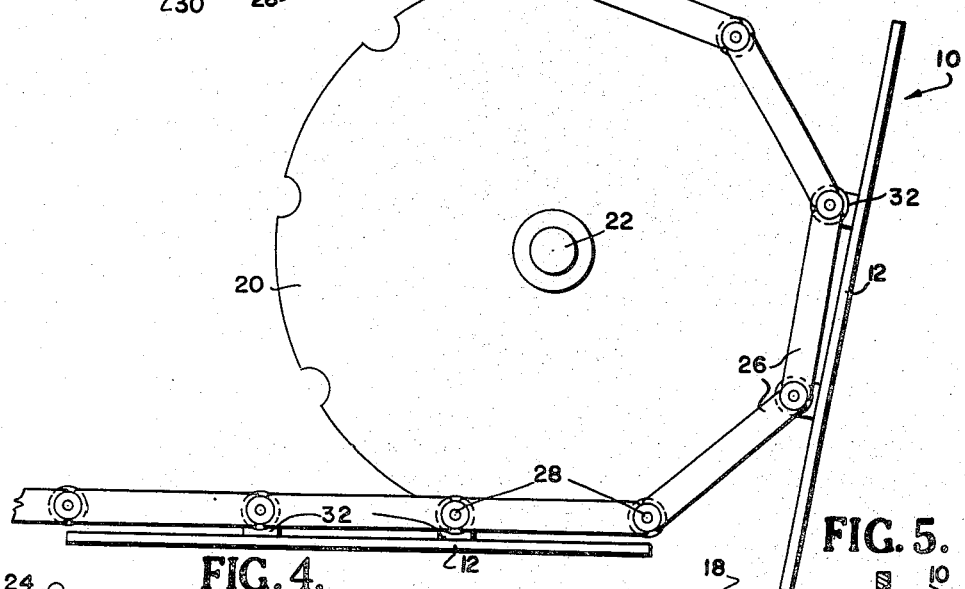
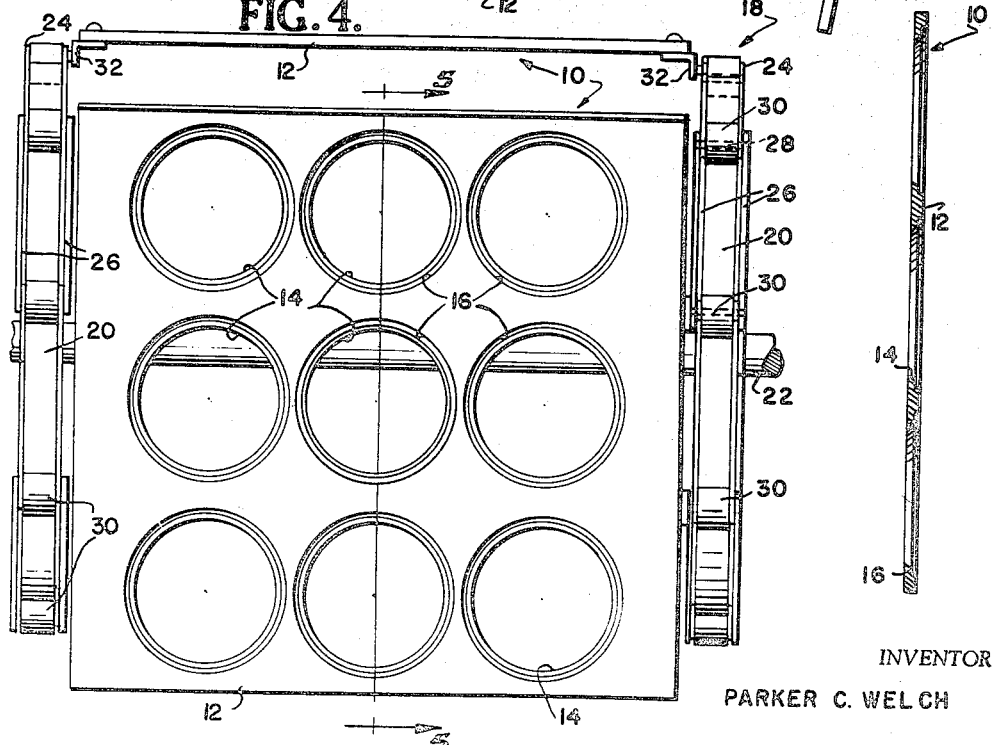

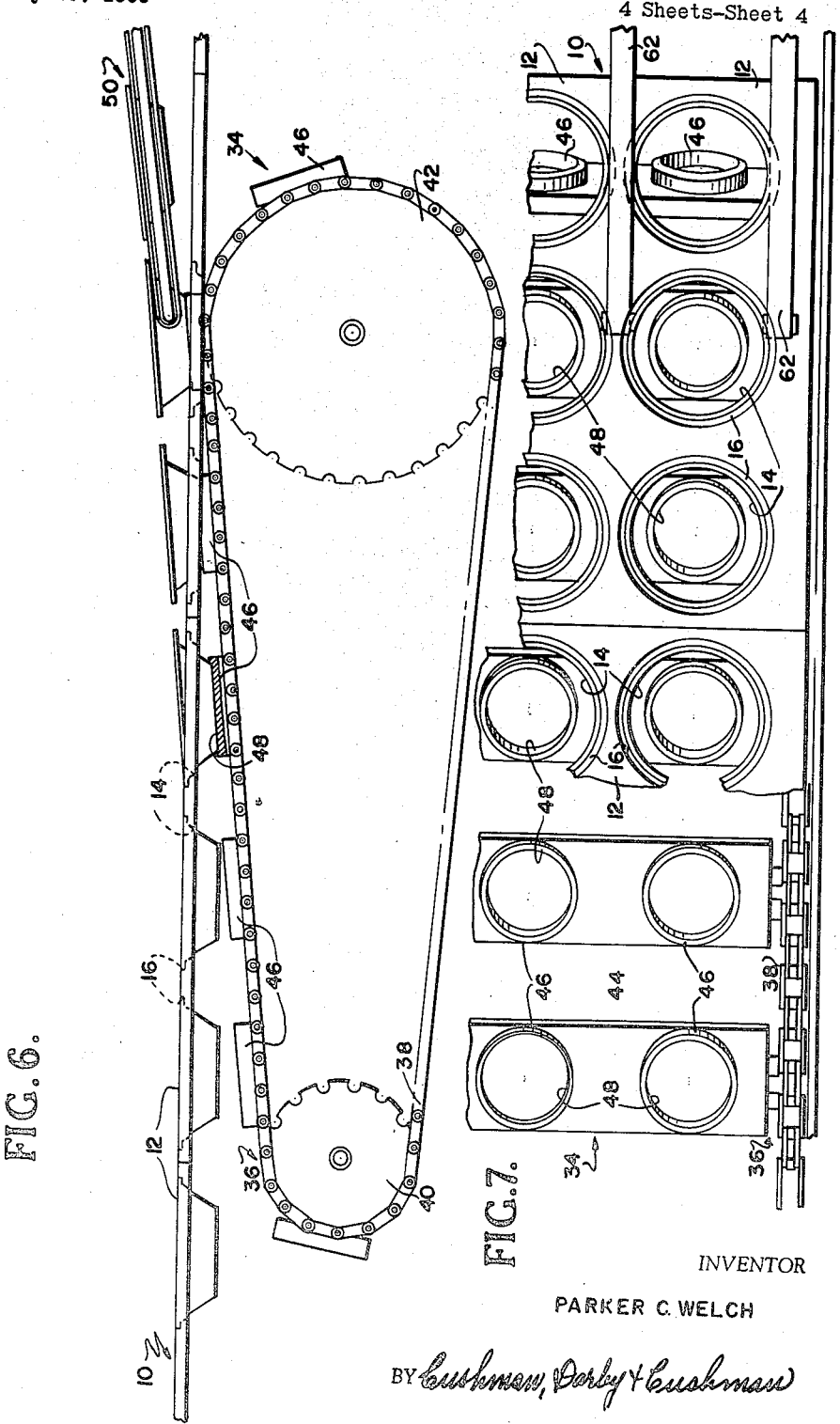

2,949,995
PIE MAKING MACHINE

Parker C. Welch, Louisville, Ky., assignor, by mesne assignments, to Continental Baking Company, a corporation of Delaware Filed May 13, 1955, Ser. No. 508,155

13 Claims. (Cl. 198—20)

This invention relates to machinery for making bakery products and more particularly to improvements in machines for making pies and the like.

In the machines presently in use in the pie making industry, the pie plates are carried on a series of holders each one of which is arranged to support a cluster of four pie plates in the middle portion thereof. The holders are mounted on an endless conveyor for movement along a predetermined path during which movement, various operations incident to the making of the pies are performed. While the holders are mounted for continuous movement, the clusters of pie plates on the holders are spaced apart an appreciable distance so that the various pie-making operations are performed intermittently. With such an arrangement, it will be apparent that maximum efficiency and speed are not obtained since there is a necessary time lag as the operations are performed on each pie plate cluster.

Accordingly, it is an object of the present invention to provide an improved pie-making machine wherein the various operations in making the pies may be performed continuously in a minimum time so as to obtain maximum output.

Another difficulty encountered in the machines presently in use results from the shape of the pie plate holders. During the making of pies, the holders with pie plates therein receive a sheet of dough which is subsequently trimmed to fit within the plates. The construction of the known holders is such that the sheet of dough hangs over the edges thereof causing unevenness in the sheet due to the pull of the dough over the holder edges. Moreover, this occurrence caused difficulties in trimming the dough sheet to size since the overhanging edges thereof tend to tear the dough sheet, thus preventing accurate trimming.

It is, therefore, another object of the present invention to provide an improved pie plate holder which is operable to support a plurality of pie plates in a position so that the sheet of dough may be placed over the pie plates without substantial overhanging edges, thereby alleviating the problems noted above.

A still further object of the present invention is the provision of an improved conveying means for moving a series of such pie plate holders in end to end relation so that a continuous sheet of dough may be utilized therewith.

Still another object of the present invention is the provision of an improved means for automatically removing the pie plates from the holders of the type described.

A still further object of the present invention is the provision of an improved means for automatically removing pie plates from a continuously moving series of pie plate holders and for transferring the removed pie plates to a belt conveyor.

These and other objects of the present invention will become more apparent during the course of the following detailed description and appended claims.

The invention may best be understood with reference to the accompanying drawings wherein illustrative embodiments are shown.

In the drawings:

Figure 1 is a fragmentary side elevational view of one embodiment of the machine of the present invention illustrating the manner in which the pie plates are removed from the pie plate holder conveyor and transferred to the discharge belt conveyor;

Figure 2 is a fragmentary top plan view of the structure shown in Figure 1;

Figure 3 is a fragmentary side elevational view of the pie plate holder conveyor means;

Figure 4 is an end view of the structure illustrated in Figure 3;

Figure 5 is a cross-sectional view of the pie plate holder taken along the line 5—5 of Figure 4;

Figure 6 is a fragmentary side elevational view showing the means for removing the pie plates from the holders;

Figure 7 is a fragmentary top plan view of the structure shown in Figure 6;

Figure 8 is a fragmentary top plan view of the modified pie plate holder; and

Figure 9 is a cross-sectional view taken along the line 9—9 of Figure 8.

The machine of the present invention is particularly adapted to produce pies of the type which are to be quickly frozen and marketed in such form. These pies may contain a filling of meat, fruit or the like and are made and marketed in a pie plate formed of aluminum sheet. In the case of meat pies, the filling is poured directly into the pie plate with only a top crust being provided. With fruit pies, the interior of the pie plate is first lined with a sheet of dough before the filling is inserted and thereafter, an upper crust is provided. It will be understood that the machine of the present invention may be utilized in making either of these pies merely by the expedient of either utilizing or eliminating the step of forming a bottom dough sheet and docking the same within the pie plate.

As shown in the drawings, the pie plate may be of conventional form and may be made of any suitable material, a preferable material being aluminum sheet as mentioned above. The plate includes a circular bottom wall having a frusto-conical wall extending from the outer edge thereof and an upper annular flange extending outwardly from the upper end of the frusto-conical wall.

While the present disclosure does not include a description of all of the various mechanisms necessary in the production of such pies, it will be understood that the portion of the machine illustrated is arranged to cooperate with these mechanisms in the conventional manner. For example, the machine may include means for placing empty pie plates within the pie plate holders, a dough sheeter for depositing a continuous sheet of dough over the pie plates, means for docking the dough within the pie plates (as in the case of fruit pies), means for depositing a filler in the pie plates, a dough sheeter for placing a top sheet of dough over the filled pie plate, means for trimming and crimping both crusts and means for baking and/or freezing the finished pie.

The present invention is more particularly directed to an improved pie plate holder for such a machine which enables the machine to function continuously so as to obtain maximum output and means for transferring the pie plates from the holders onto a discharge conveyor.

With the above in mind and referring to Figures 1–8 of the drawings, there is illustrated one embodiment of a pie plate holder, generally indicated at 10, embodying the principles of the present invention. The holder 10 comprises a generally rectangular, relatively thin plate 12 which may be made of any suitable material, such as steel, aluminum or the like. The plate 12 is provided with a plurality of openings 14 which are preferably arranged so that the spacing between adjacent openings will be substantially double the spacing between the ends of the plate and the openings adjacent thereto. As shown in Figure 2, nine such openings are provided in the plate with the openings being arranged in three rows extending between the ends of the plate, each row containing three openings. The openings of each row are spaced apart a relatively short distance which is substantially double the distance between the outer openings and the adjacent end of the plate.

Surrounding each of the openings 14 is an annular groove 16 which faces upwardly so as to receive and support the upper annular flange of a pie plate. If desired, the openings 14 may be made frusto-conical in shape for receiving the upper end of the frusto-conical wall of the plates with the bottom wall of the plates being disposed below the holder. It will be noted that the upper surface of the holder plate surrounding the grooves 16 is completely flat so as to receive a dough sheet and maintain the same in a flat condition above the pie plates. With this type of holder plate, the dough trimmer cooperating therewith may be provided with suitable cutting flanges to cut out pieces of dough suitable to enter the pie plates.

The pie plate holders 10 are arranged to be moved in end to end relation along a predetermined circuitous path by a main conveyor means 18 which will now be described. The conveyor means 18 is illustrated somewhat schematically in the drawings and includes a supporting frame (not shown) arranged to support a series of pairs of horizontally spaced sprocket wheels, one pair of which is illustrated in Figures 3 and 4, as at 20. These sprocket wheels are disposed at the discharge end of the conveyor and are mounted for rotation on a common transverse horizontal shaft 22 suitably journalled in the frame. Trained about sprocket wheels 20 and the other sprocket wheels of the series is a pair of endless chains 24. Each chain 24 comprises an endless series of relatively long parallel links 26 interconnected at their free ends by pins 28 around which rollers 30 are journalled.

The holders are preferably mounted on the conveyor means 18 between chains 24 by means of a plurality of angular plates or L-shaped brackets 32. The plates 32 include a vertical leg connected to the pins 28 and a horizontal leg secured to the undersurface of the holders. As best shown in Figures 4 and 5, the holders 10 are mounted on the conveyor 18 in end to end abutting relation so that during an upper substantially horizontal run of the main conveyor, the openings in the holders will be spaced apart substantially the same distance with respect to the direction of travel. In other words, since the space between the outer openings and the adjacent end of the holders is substantially one-half of the normal spacing between adjacent openings, when the holders are placed in abutting end to end relation, the adjacent outer openings of abutting holders will be spaced apart substantially the same distance as the spacing between adjacent openings within a single holder. In this manner, the holders of the present invention enable the various operating mechanisms (not shown) of the machine to operate continuously at even intervals with said intervals being reduced to a minimum. The holder arrangement of the present invention also enables the utilization of a continuous dough sheeter whereas heretofore the dough sheeters have been operable merely to intermittently feed separate sheets of dough to each pie plate cluster.

As noted above, the conveyor of the pie plate holders includes an upper horizontal run during which the various operations briefly set forth above, may be performed so as to produce the pies within the pie plates. When the production of the pies has proceeded to a point where no further operation may be performed while they are supported in the holders, as for example, after the top crust has been positioned thereon, the pie plates are removed from their holders. To this end, the present invention provides a novel pie plate removing means, generally indicated at 34, which comprises an endless chain conveyor 36 including parallel horizontally spaced chains 38 trained about parallel pairs of spaced sprocket wheels 40 and 42. Sprocket wheels 40 and 42 are rotatable about parallel transverse horizontal axes with sprocket wheel 40 being of a smaller diameter than sprocket wheel 42 so as to provide an inclined upper run. The pie plate removing means 34 is suitably mounted on the main frame of the machine so that its upper inclined run may be disposed directly beneath the horizontal upper run of the main conveyor. Extending transversely between chains 38 is a series of bars 44, each of which has a plurality of pie plate bottom engaging members or plungers 46 extending outwardly therefrom. The members 46 are arranged on the conveyor in positions corresponding to the positions of the openings 14 of the holders. The plungers or members 46 are of a size and shape sufficient to pass through the openings 14 and have their outer surfaces provided with recesses 48 adapted to receive the bottom of the pie plates.

As shown in Figure 6, the conveyor 36 is moved in timed relation with the main pie plate holder conveyor so that as the members 46 travel up the inclined run, the recesses 48 thereof will engage the bottom of the pie plates extending through the openings in the holders. As the members continue to move upwardly along their inclined run, the pie plates will be moved upwardly from their supported engagement within the annular grooves 16 until the same are completely supported by the members 46. When the members reach the end of their inclined run, they are disposed in a position within corresponding openings of the holders so that the pie plates supported thereby will be spaced substantially above the upper surface of the holders.

In order to receive the pie plates moved upwardly by the means 34 and to convey the same away from their holders, a pie plate transferring means, generally indicated at 50, is provided above the upper run of the main conveyor. The pie plate transferring means 50 includes a pair of side frame rails 52 suitably supported on the main frame of the machine in a position adjacent means 34 above the holders 10. Rigidly connected between side rails 52 are a plurality of inclined longitudinally extending frame members 54 spaced apart horizontally sufficient to receive pie plates therebetween. Each frame member 54 has a roller 56 journalled on the lower end thereof and a horizontal transverse shaft 58 is journalled between side rails 52 adjacent the upper ends of frame members 54. A plurality of spaced sprocket wheels 60 are mounted on shaft 58, one wheel being in alignment with each roller 56. Trained about each aligned roller and sprocket wheel is a relatively narrow belt 62 which may have suitable spaced notches therein for meshing with the teeth of the sprocket wheels. Belts 62 are preferably made of rubber or the like but it will be understood that a suitable chain may be utilized if desired.

As shown in Figure 2, four such belts are provided which are spaced apart and positioned to receive therebetween the three rows of pie plates as they are moved upwardly by the members 46 at the end of their inclined upper run. The pie plates are supported between two adjacent belts at opposite sides of their upper annular flange, the upper surfaces of the longitudinal frame members 54 serving to support the upper runs of the belts as they carry the pie plates upwardly.

Extending transversely between the sprocket wheels 60, is a pair of diametrically opposed rods 64 which serve to move the pie plates onto a discharge belt conveyor 66 arranged to carry the pies to an oven or a freezer or both depending upon the operation desired. A transversely extending guide element 68 is connected between side rails 52 for supporting and guiding the pie plates from the ends of the belts onto the belt conveyor.

In operation, as the pie plates are moved upwardly from the holders by the operation of the members 46, the same will be positioned between the ends of adjacent belts 62 so as to be supported thereby as the members 46 move downwardly after reaching the end of their inclined run. As shown in Figure 7, the belts 62 engage opposite sides of the upper annular flange of the pie plates and carry the same along the upper run thereof toward the sprocket wheels 60. The belts 62 preferably travel at a linear speed greater than the linear speed of the holders so as to space the pie plates a greater distance apart than they are normally spaced apart on the holders. The rotation of sprocket wheels 60 is coordinated with the movement of the main conveyor so that as the pie plates approach the end of the upper run of the belts, they will be received between the rods 64. The rod 64 adjacent the rear end of the pie plates during its movement, serves to move the pie plates past the guide element 68 onto the discharge belt conveyor 66.

In Figures 8 and 9, there is shown a modified form of plate holder which comprises a relatively thin rectangular plate 70 having a plurality of openings 72 formed therein in the manner previously described. Extending upwardly from the upper flat surface of the plate is an annular flange 74 disposed in surrounding relation to each of the openings and spaced therefrom so as to form annular grooves 76 therein. The flanges 64 are adapted to cooperate with a smooth-surfaced cylindrical roller operable to trim a continuous sheet of dough placed over the holders. This arrangement obviates the necessity of providing a cutting flange on the trimmer as is required in trimming the dough sheet placed on the holder 10, illustrated in Figures 1–7.

Referring now to Figure 1, it will be appreciated that the construction and arrangement of the holders 10 on the main conveyor will permit optimum output due to the evenly and closely spaced pie plate supporting openings 14. Thus, the present arrangement renders possible the use of a dough sheeter operable to place a continuous sheet of dough on the holders. This continuous sheet is received and maintained in a flat condition on the flat upper surface of the holders in a position to be inserted in the pie plates. The problem of overhanging dough is eliminated and less dough remains on the holders after the same has been trimmed to fit into the pie plate. For example, Figure 1 illustrates a trimming roller 80 adapted to trim a continuous sheet of dough to be utilized as a top crust for the pies. After the top crust has been suitably crimped, if desired, the pies are then removed from their holders in the manner indicated above. The dough remaining on the holders will be carried to the discharge end of the main conveyor where the same falls or is suitably stripped off onto a suitable belt 82 operable to convey the same to a collection station.

It is to be understood that the forms of the invention herewith shown and described are to be taken as the preferred embodiments of the same and that various changes may be made without departing from the spirit of the invention and the scope of the appended claims.

I claim:

1. In a machine for making pies, a series of pie plate holders for supporting a series of pie plates with their bottoms exposed, means for moving said holders along a predetermined endless path, a series of pie plate bottom engaging members for removing said pie plates from said holders, means for moving said members along a predetermined endless path of a circuitous distance substantially less than the circuitous distance of said first mentioned endless path, said members being operable during their movement to engage the bottoms of said pie plates and to move the same upwardly from their support on said holders, and means for receiving the upwardly moved pie plates supported by said members.

2. A machine as defined in claim 1 wherein said members are provided with recesses in their upper surfaces for receiving the bottom of said pie plates.

3. A machine as defined in claim 1 wherein said members are of a size and shape suitable to pass upwardly within pie plate supporting openings formed in said holders.

4. In a machine for making pies, a series of pie plate holders for supporting a series of pie plates with their bottoms exposed, means for moving said holders along a predetermined endless path, means engaging the bottom of said pie plates for moving the same upwardly from their support on said holders, means disposed above said holders for engaging the upwardly moved pie plates on opposite sides above the bottoms thereof, said upwardly moved pie plate engaging means being operable to remove the pie plates from their engagement with said pie plate bottom engaging means and conveying the same away from said holders.

5. A machine as defined in claim 4 wherein said upwardly moved pie plate engaging means includes means for transferring the pie plates conveyed thereby onto a belt conveyor.

6. A machine as defined in claim 4 wherein said upwardly moved pie plate engaging means comprises a pair of horizontally spaced endless conveyors having parallel upper runs for supporting the pie plates therebetween.

7. A machine as defined in claim 6 wherein said horizontally spaced endless conveyors include wheels rotatable about a common horizontal axis at the discharge end of said run and a transverse bar extending between said wheels for engaging said pie plates to transfer the same onto a belt conveyor.

8. In a machine for making pies, a series of pie plate holders having openings therein for supporting a series of pie plates with their bottoms exposed, first conveyor means for continuously moving said holders in end to end relation along a predetermined endless path having a substantially horizontal run, a series of pie plate bottom engaging members for removing said pie plates from said holders during their movement along said run, second conveyor means for continuously moving said members along a predetermined endless path of a circuitous distance substantially less than the circuitous distance of said first mentioned path, said members being movable during a portion of their path of movement into engagement with the pie plate bottoms moving along said run so as to move the same upwardly from their support within said holder openings, and third conveyor means disposed above said run for receiving the upwardly moved pie plates and moving the same away from said holders.

9. A machine as defined in claim 8 wherein each of said plate holders comprises a relatively thin rectangular flat plate having a plurality of openings therein and upwardly facing annular grooves surrounding said openings for receiving the upper annular flanges of the pie plates to support the same thereby with their bottoms extending through said openings.

10. A machine as defined in claim 8 wherein said first conveyor means comprises a pair of horizontally spaced endless chains and angular plates having vertical legs secured to said chains and horizontal legs secured to said holders for supporting said holders between said chains.

11. A machine as defined in claim 8 wherein said means for receiving the upwardly moved pie plates comprises a pair of horizontally spaced endless conveyors having parallel upper runs for supporting the pie plates therebetween, wheels rotatable about a common horizontal axis at the discharge end of said run, and a transverse bar extending between said wheels for engaging the pie plates to transfer the same to a belt conveyor.

12. A conveyor assembly for transporting foodstuffs comprising in combination, a conveyor, recessed food receptacle holders movable therewith and having bottom openings in the recessed portions of the holders, a second conveyor arranged to contact articles in said holders through said openings and unseat them from said holders, and a third conveyor arranged to remove unseated articles from above said holders.

13. A conveyor assembly for transporting foodstuffs comprising in combination, a conveyor, recessed food receptacle holders movable therewith and having bottom openings in the recessed portions of the holders, a second conveyor arranged to contact receptacles through said openings and unseat them from said holders, and a third conveyor comprising a pair of spaced apart conveying means arranged to extend over said holders in their positions wherein receptacles are unseated and to engage opposite sides of the unseated receptacles for removal.

References Cited in the file of this patent

UNITED STATES PATENTS

| | | |
|---|---|---|
| 815,707 | Hutchison | Mar. 20, 1906 |
| 1,089,795 | Schafer | Mar. 10, 1914 |
| 1,384,461 | Halset | July 12, 1921 |
| 1,575,214 | Kohler | Mar. 2, 1926 |
| 2,188,558 | Smith | Jan. 30, 1940 |